United States Patent [19]

Stull

[11] Patent Number: 5,753,336
[45] Date of Patent: May 19, 1998

[54] REVERSIBLE UNDERLAY FOR RUGS

[76] Inventor: Thomas Emerson Stull, Box 242-8, Rt. 3, Decatur, Tenn. 37322

[21] Appl. No.: 720,573

[22] Filed: Oct. 2, 1996

[51] Int. Cl.$^6$ .................................. B32B 3/02; B32B 3/06
[52] U.S. Cl. .................... 428/86; 428/95; 428/100; 238/14
[58] Field of Search ............... 238/14; 428/86, 428/95, 100

[56] References Cited

U.S. PATENT DOCUMENTS

| | | | |
|---|---|---|---|
| 3,007,205 | 11/1961 | House | 18/53 |
| 3,441,464 | 4/1969 | Blue | 428/90 |
| 3,749,309 | 7/1973 | Becker | 238/14 |
| 4,174,991 | 11/1979 | Reuben | 156/242 |
| 4,187,337 | 2/1980 | Romageon | 428/95 |
| 4,388,484 | 6/1983 | York | 238/14 |
| 4,710,415 | 12/1987 | Slosberg | 428/48 |
| 4,748,063 | 5/1988 | Reuben | 428/86 |
| 4,762,741 | 8/1988 | Hedley | 428/78 |
| 4,822,658 | 4/1989 | Pacione | 428/86 |
| 4,840,309 | 6/1989 | Teresi | 238/14 |
| 5,130,187 | 7/1992 | Eberhardt | 428/95 |
| 5,154,961 | 10/1992 | Reuben | 428/82 |
| 5,171,619 | 12/1992 | Reuben | 428/95 |
| 5,204,159 | 4/1993 | Tan | 238/14 |
| 5,362,544 | 11/1994 | Reuben | 428/82 |
| 5,382,462 | 1/1995 | Pacione | 428/86 |

FOREIGN PATENT DOCUMENTS

| | | |
|---|---|---|
| 252776 | 6/1926 | United Kingdom . |
| 686284 | 1/1953 | United Kingdom . |
| 1124292 | 8/1968 | United Kingdom . |
| 1227377 | 4/1971 | United Kingdom . |
| 2133993 | 5/1985 | United Kingdom . |
| 2115693 | 6/1985 | United Kingdom . |

*Primary Examiner*—Terrel Morris
*Attorney, Agent, or Firm*—Luedeka, Neely & Graham P.C.

[57] ABSTRACT

A reversible underlay device for positioning between a rug and an underlying flooring surface to inhibit movement of the rug relative to the underlying flooring surface. In a preferred embodiment, the device includes a relatively resilient, conformable layer adjacent to a relatively firm layer having a plurality of outwardly extending nibs or protrusions. When a rug is placed over carpeting, the underlay may be oriented between the rug and the carpeting such that the nibs penetrate into the carpeting and the relatively resilient, conformable layer is adjacent the underside of the rug. When the rug is placed over a relatively hard flooring surface such as wood, tile or vinyl, the underlay is oriented between the rug and the carpeting such that the nibs penetrate into the back of the rug and the relatively resilient, conformable layer is against the flooring.

20 Claims, 6 Drawing Sheets

REVERSIBLE UNDERLAY FOR RUGS

FIELD OF THE INVENTION

This invention relates generally to devices for positioning between a rug and an underlying flooring surface. More particularly, this invention relates to a reversible device which may be positioned between a textile-backed rug and either an underlying hard surface or a carpeted surface to inhibit movement of the rug relative to the underlying flooring surface.

BACKGROUND OF THE INVENTION

Creep or movement of a rug relative to the underlying support surface, be it a hard flooring surface or carpeting is undesirable. In the case of wall-to-wall carpeting, this creep is believed to occur as a result of the directional lie of the wall-to-wall carpeting which produces a frictional effect on the rug as pressure is applied by the foot different from the effect when pressure is released, so that the rug has a net movement typically in the direction in which the pile lies.

Various attempts have been made in the art to prevent or eliminate undesirable creep, however, such attempts desire improvement. For example, conventional underlay devices are typically suitable for use over either a carpeted surface or a hard flooring surface, but not both. This is particularly disadvantageous from a manufacturing perspective in that it requires the manufacture of more than one type of article in order to meet the need of the consumer. This is also disadvantageous from a retailing perspective in that increased inventory and floor space are required to market multiple products as compared to the marketing of one product suitable for a variety of uses. As will be appreciated, this also complicates matters for the consumer.

Accordingly, there is a need in the art for an underlay device suitable for use with a wide variety of flooring surfaces.

SUMMARY OF THE INVENTION

Accordingly it is an object of the present invention to provide an improved device for placing between a rug and an underlying flooring surface.

Another object is to provide a device of the character described for use with a variety of flooring surfaces.

A further object of the present invention is to provide an underlay of the character described which is relatively unnoticeable so as to not detract from the aesthetics of the rug.

It is yet another object of this invention to provide an underlay of the character described which is economical, versatile and easy to use.

Having regard to the foregoing and other objects, the present invention is directed to a reversible underlay device for positioning between a rug and an underlying flooring surface to inhibit movement of the rug relative to the underlying flooring surface. The underlay preferably includes a relatively resilient, conformable layer having a first relatively flat surface opposite a second relatively flat outwardly facing surface, the second surface being positionable adjacent the underside of the rug or the flooring surface for conforming thereto. A relatively firm layer is provided adjacent the relatively resilient, conformable layer and includes a relatively smooth surface opposite a relatively rugous outwardly facing surface, the relatively rugous surface being positionable adjacent the underside of the rug or the flooring surface for frictional engagement therewith. The first surface of the relatively resilient, conformable layer is matingly attached to the relatively smooth surface of the relatively firm layer.

In a preferred embodiment, the rugous surface of the second layer is provided by a plurality of outwardly extending nibs. When a rug is placed over carpeting, the underlay is preferably oriented between the rug and the carpeting such that the nibs penetrate into the carpeting entangling the filaments of the carpeting to inhibit relative movement of the underlay and carpet. The foam layer is adjacent the underside of the rug to provide a frictional interface which inhibits creep of the rug relative to the underlay.

When the rug is placed over a relatively hard flooring surface such as wood, tile or vinyl, the underlay is oriented between the rug and the flooring such that the nibs penetrate into the back of the rug and the foam layer is against the flooring to inhibit creep of the rug.

In another aspect, a reversible underlay having a layer of loop material having oppositely facing surfaces and a relatively firm layer adjacent the layer of loop material and having a first relatively smooth surface opposite a second relatively rugous outwardly facing surface.

One surface of the layer of loop material is matingly attached to the first surface of the relatively firm layer and the relatively rugous surface of the underlay is positionable adjacent either the flooring surface or the backing surface of the rug, with the other surface of the layer of loop material positionable adjacent either the backing surface of the rug or the flooring surface.

The back of the loop material is attachable to either the backing of the rug or the flooring surface by one or more portions of hook material positionable between either the backing surface of the rug and the adjacent loop material, or the flooring surface and the adjacent loop material, and having an adhesive surface fixedly securable to either the backing surface of the rug or the flooring surface, and the hook material releasably attachable to the adjacent surface of the loop material.

BRIEF DESCRIPTION OF THE DRAWINGS

The above and other features and advantages of the present invention will become further known from the following detailed description when considered in conjunction with the accompanying drawings in which.

DETAILED DESCRIPTION

Figures 1, 1A, 1B:
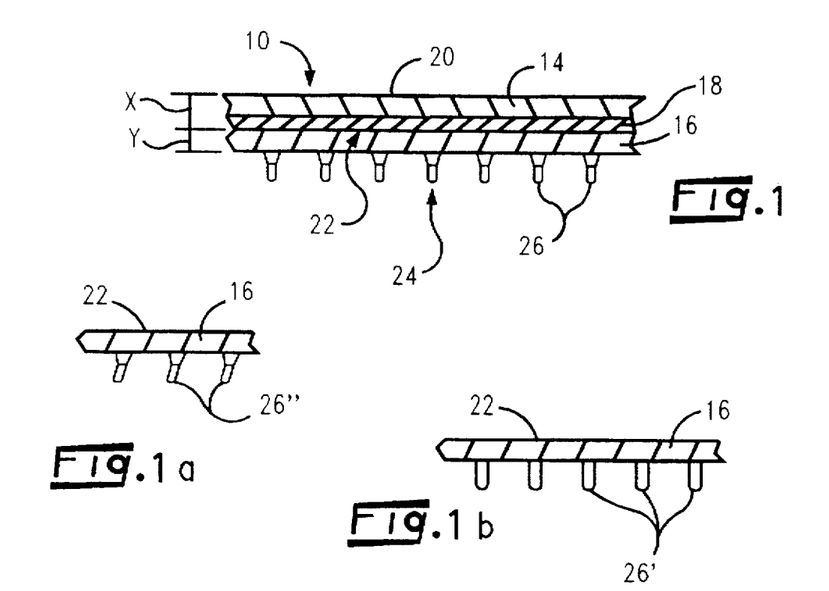
FIG. 1 is a cross-sectional view of a preferred embodiment of a reversible underlay according to the invention.
FIG. 1a is a partial cross-sectional view of another embodiment of the underlay of FIG. 1 which includes angled nibs.
FIG. 1b is a partial cross-sectional view of an embodiment of the underlay of FIG. 1 having cylindrical nibs.
Figure 2:
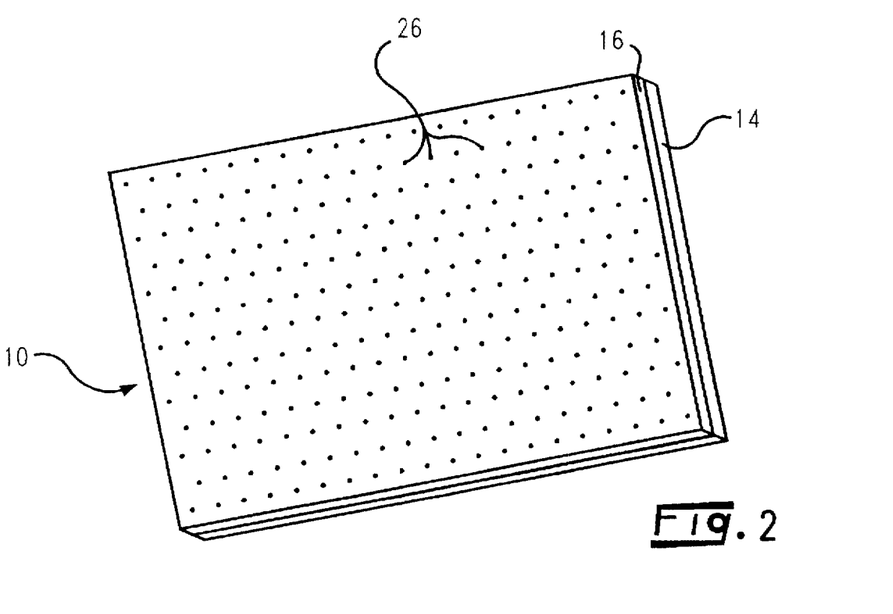
FIG. 2 is a perspective view of the underlay of FIG. 1.
Figure 3:
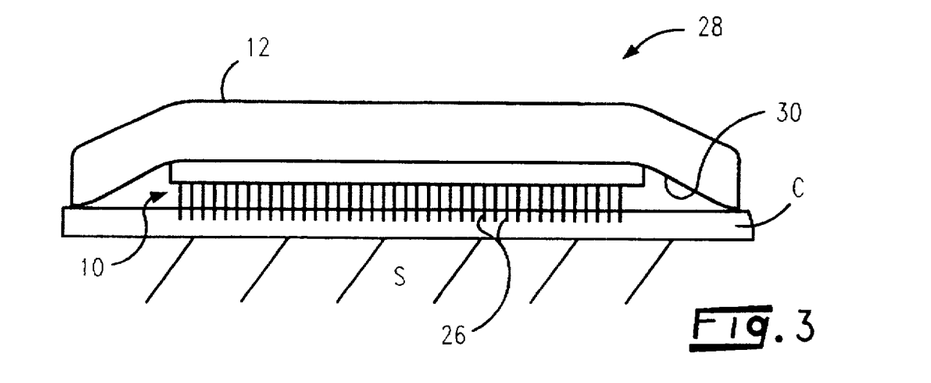
FIG. 3 is a cross-sectional view of the underlay of FIG. 1 positioned between a rug and an underlying carpeted surface to inhibit movement of the rug relative to the carpeted surface.

Referring now in more detail to the drawings, in which like numerals refer to like parts throughout the several views, and with initial reference to FIGS. 1-3, there is shown a reversible underlay 10 in accordance with a preferred embodiment of the present invention. The underlay 10 is "reversible" and is thus suitable for placement between a rug 12 (FIG. 3), typically a textile backed rug having an upper decorative surface, and wither an underlying soft flooring surface, such as wall-to-wall carpeting C or a relatively hard flooring surface such as wood, tile or vinyl flooring F (FIG. 4) overlying a sub-flooring S, to inhibit movement of the rug 12 relative to the underlying carpeting or flooring.

With further reference to FIGS. 1, 1a, and 1b, the underlay 10 preferably includes a relatively resilient, conformable layer 14 and a relatively firm layer 16 adjacent the layer 14. The relatively resilient, conformable layer 14 preferably includes a relatively flat surface 18 opposite a relatively flat outwardly facing surface 20 and the layer 16 includes a relatively smooth surface 22 opposite a relatively rugous outwardly facing surface 24. The surface 18 of the layer 14 is preferably matingly attached to the surface 22 of the layer 16, as by thermal bonding or adhesive, with the surface 20 of the layer 14 and the surface 24 of the layer 16 facing oppositely of one another.

The layer 14 is preferably provided by a layer of a resilient, conformable material, preferably a foamed material attached to a paper-thin sheet of backing material, such a polypropylene open weave web or scrim, to provide resistance to tearing. The layer 14 preferably has an overall thickness X of from about 1/32 inch to about 3/8 inch. The preferred foam/scrim material, as explained below, is available commercially as a composite sheet. Thus, the layer 14 is described as one layer, even though it preferably is a marriage of a foam material bonded to a scrim material.

A preferred foam/scrim material is a blend of cold polymerized styrene butadiene latex having a polypropylene scrim backing. A preferred styrene-butadiene/scrim material has a density of from about 5 lbs/ft$^3$ to about 8 lbs/ft$^3$ and is available in sheet form under the tradename CHECKMATE from Foam Products Corporation of Calhoun, Ga. The scrim backing material used in the CHECKMATE product is a polypropylene scrim available under the tradename ACTIONBACK, product no. 3804, from Amoco Fabrics Company of Atlanta, Ga. Thus, in relation to the layer 14 described above, the surface 18 of the layer represents the scrim backing material.

Suitable alternatives to styrene butadiene latex include other foamed or non-foamed materials and frothed or non-frothed polymers. These materials may include polyurethanes, latex, natural latex, neoprene latex, acrylonitrile butadiene rubber, acrylic latex, polyvinyl chloride plastisol, and sponge rubber. To provide the desired resistance to movement of the layer 14 relative to a rug, carpeting or flooring, the material is preferably selected so that the surface 20 of the layer 14 has a static coefficient of friction of at least about 0.75 as measured by ASTM method D 1894-90 using a model 32-06 monitor/slip and friction apparatus. Such materials are preferably provided with a scrim backing such as the ACTIONBACK polypropylene scrim described previously. The conformable material may be affixed to the scrim material in a manner well known in the art, such as by depositing the conformable material as a latex foam onto the scrim and heat curing.

The layer 14 and the layer 16 are preferably substantially identical in size and configured such that the underlay is substantially the same shape but slightly smaller than the rug 12 under which it is to be positioned so that the underlay 10 is substantially hidden from view. For example, for a rectangular rug having a length of about 60 inches and a width of about 36 inches, the underlay preferably has a length of from about 56 inches to about 58 inches and a width of from about 32 inches to about 34 inches, such that the ratio of the area of the underlay to that of the rug is from about 0.8 to about 0.9. However, it will be appreciated that the underlay may be of virtually of any size and that several portions much smaller than the rug may be used.

The relatively firm layer 16 is preferably provided by a sheet of thermoplastic material having a thickness of from about 1/16 inch to about 3/8 inch, as indicated by the distance Y shown in FIG. 1. As used herein, the terminology "relatively firm" refers to a property of thermoplastic material in that it tends to remain substantially straight when held out at arm's length but will bend when pressure is applied. Examples of suitable thermoplastic materials include ethylene vinyl acetate, polyethylene, polyamide, polypropylene, polyester, polyvinyl chloride, and mixtures thereof. The layer 16 may be provided using conventional extrusion or hot melt equipment and a preferred starting material for use in providing the layer 16 are ethylene vinyl acetate copolymers ("EVA")available under the trade name ELVAX from DuPont having a hardness (Shore A-2) of from about 70 to about 95. The 400 series of these EVA polymers, such as ELVAX 410, are particularly preferred.

As mentioned above, the surface 24 of the layer 16 is relatively rugous. As used herein the term "relatively rugous" refers to the texture of the surface 24 in that it is somewhat roughened and does not tend to slide when positioned against surfaces such as the underside of a textile-backed rug or wall-to-wall carpeting. In a preferred embodiment, the surface 24 is provided by a plurality of nibs or protrusions 26 (FIG. 1) which are preferably uniformly spaced apart from one another and extend in a direction generally outward from the surface 22 of the layer 16. The nibs 26 may be of virtually any shape, but are preferably uniformly circular in cross-section (i.e., cylindrical) as shown in FIG. 1b (26') or having a frusto-conical shape as shown in FIGS. 1 (26) and 1c (26")or a mixture thereof. In addition to nibs, other roughened surfaces, such as pebbling, dimpling, tread, and various other textures may provide a suitable surface for use in the invention provided they tend to frictionally engage the carpet surface or rug backing.

The nibs 26' of FIG. 1b are preferably circular in cross section and have a diameter of from about 1/16 inch to about 1/4 inch and a length of from about 1/16 inch to about 3/8 inch and are positioned with their length normal to the layer 16.

The frusto-conical nibs 26 and 26" preferably have a length from about 1/16 to about 1/8 and have a diameter at their base of from about 3/32 inch to about 1/4 inch and a diameter at their tip of from about 1/16 to about 1/4. As shown in FIG. 1a, nibs 26" extend from the layer 16 at an angle of from about 60 degrees to about 120 degrees and when used over carpeting C, the underlay 10 having nibs 26" is preferably aligned such that the nibs 26" are angled against the lie of the carpeting C. This arrangement tends to reduce the incidence of breakage of nibs and facilitates penetration of the nibs into the carpeting or backing of the rug.

The nibs 26 (and 26' and 26")may be arranged in virtually any pattern. However, as shown in FIG. 2, it is preferred to provide the nibs 26 in uniformly spaced rows, with each nib 26 being spaced apart (as measured from center-to-center) a distance of from about 1/4 inch to about 1 1/2 inches, preferably about 1/2 inch.

Figure 3A:
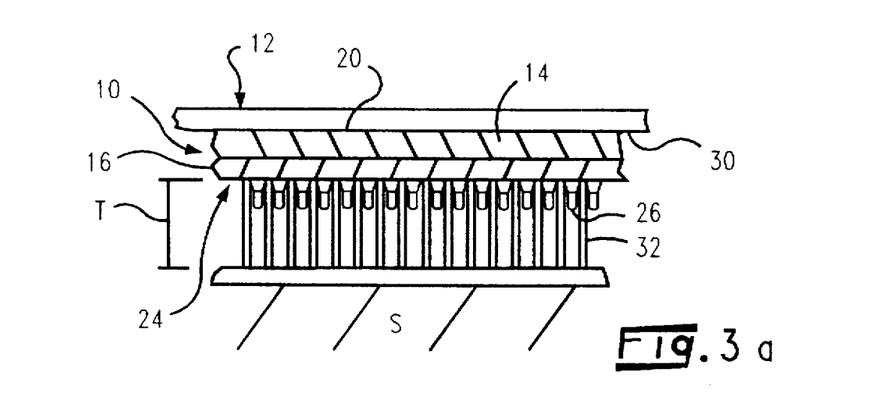
FIG. 3a is a close-up view of a portion of FIG. 3 showing penetration of the nibs of the underlay into the carpet.
Figure 3B:
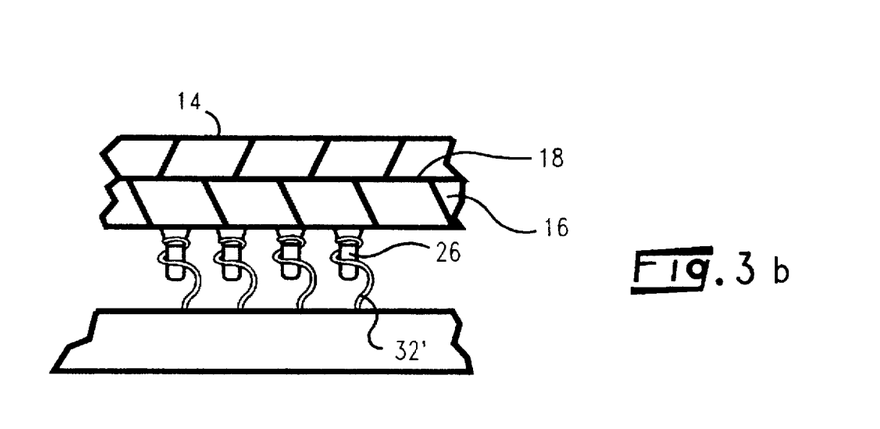
FIG. 3b is a close-up view of a portion of FIG. 3 showing filaments of the carpet fibers entangled with the nibs of the underlay

With reference now to FIGS. 3–3b, there is shown a preferred embodiment of a flooring structure 28 in which the underlay 10 is positioned between the rug 12 and the carpeting C. The underlay is preferably positioned so that at least a portion of the underside or backing surface 30 of the rug 12 contacts the surface 20 of the layer 14, and the rugous surface 24 (and hence the nibs 26) of the layer 16 contacts the carpet C. As mentioned previously, the underlay 10 is preferably sized to conform generally in shape to the rug 12, but with a smaller size. This, combined with the relatively small thickness of the underlay 10, renders the underlay 10 virtually undetectable to the casual observer.

As shown in greater detail in FIG. 3a, with the underlay 10 positioned as described, the nibs 26 engage fibers 32 of the carpet C and penetrate slightly into the thickness T of the carpet C to provide a frictional interface between the underlay 10 and the carpet C so that there is a significant resistance to sliding of the rug 12 relative to the carpet C and there is not any significant movement of the rug 12 relative to the carpet C when the rug 12 is walked upon.

The combined weight of the rug 12 and the underlay 10 is relatively low and the rug 12 and underlay 10 typically do not have sufficient mass to depress the carpet C to any significant degree absent the weight of a user thereon. However, the yarn which makes up the fibers 32 of the carpet is typically made from many small filaments, such as filaments 32' (FIG. 3b) and, as pressure is applied to the underlay, as by a person walking over it, the nibs 26 penetrate into the thickness T of the carpet such that the fibers 32 deform and the filaments 32' tend to entangle with the nibs 26 to provide additional resistance to movement.

In addition, it will be appreciated that the backing surface 30 of the rug 12 is preferably a textile-type backing of a type well known in the art which has a relatively open weave and provides a somewhat roughened surface. Thus, due to the conformable nature of the surface 20 of the layer 14, the layer 20 tends to conform to and compress against the backing 30 of the rug 12 to resist sliding of the rug 12 relative to the underlay 10. This compression and resistance has also been observed to increase when the rug 12 is walked upon to further inhibit movement of the underlay 10 relative to the rug 12 when the rug 12 is walked upon.

Accordingly, it will be appreciated that the frictional resistance of the underlay 10 and the rug 12 and of the underlay 10 relative to the carpet C is generally sufficient to retain the rug 12 and underlay 10 in place when not walked upon and that increased frictional resistance occurs upon application of pressure to the rug 12, such as when walked upon, which tends to inhibit relative movement of the rug 12 and the underlay 10 and of the underlay 10 and the carpet C to substantially inhibit movement or creep of the rug 12 relative to the carpet C.

Figure 4:
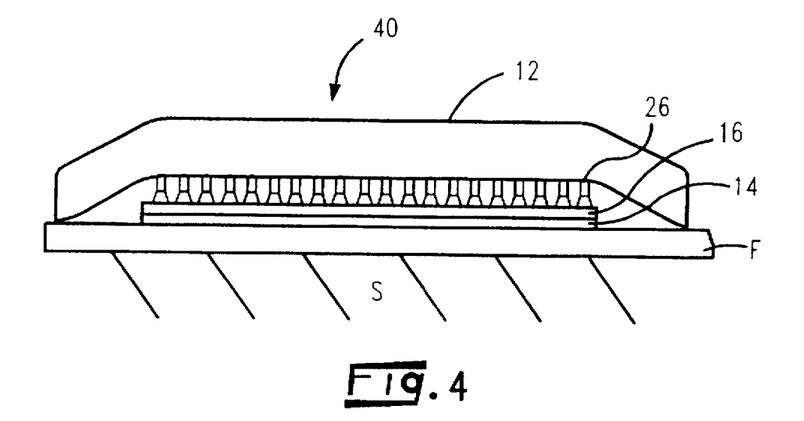
FIG. 4 is a cross-sectional view of the underlay of FIG. 1 positioned between a rug and an underlying relatively smooth flooring surface such as vinyl, tile, or wood to inhibit movement of the rug relative to the flooring surface.

Turning now to FIG. 4, there is shown a preferred embodiment of a flooring structure 40 in which the underlay 10 is reversed from the embodiment of FIG. 3, that is, the underlay 10 is positioned between rug 12 and flooring F, with at least a portion of the underside or backing surface 30 of the rug 12 in contact with at least a portion of the rugous surface 24 (and hence the nibs 26) of the layer 16 and the surface 20 of the layer 14 in contact with the flooring F.

Figure 4A:
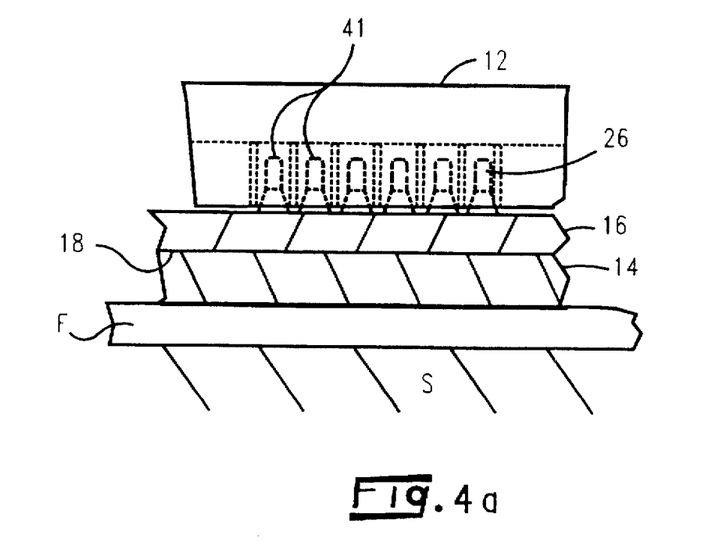
FIG. 4a is a close-up view of a portion of FIG. 4 showing penetration of the nibs of the underlay into the underside surface of the rug.

As shown in greater detail in FIG. 4a, with the underlay 10 positioned as described, it will be appreciated that the nibs 26 penetrate slightly into openings or spaces 41 between the fibers in an open weave arrangement of a textile-backing surface 30 of the rug 12 to provide a frictional interface between the underlay 10 and the rug 12 so that there is resistance to sliding of the rug 12 relative to the flooring F. When pressure is applied to the rug 12 such as when a user walks across the rug 12, the nibs 26 penetrate deeper into the spaces of the open weave of the textile-backing surface 30 to provide additional frictional resistance which tends to inhibit movement of the rug 12 relative to the flooring F when the rug 12 is walked upon.

As will be appreciated, the underlay 10 of the present invention offers numerous advantages over conventional devices. For example, the underlay 10 is relatively inexpensive to produce and is also relatively lightweight and transportable. The underlay is also flexible so that it can be rolled-up with a rug and is relatively thin such that the underlay 10 is not readily noticeable and does not detract from the aesthetics of the rug 12. In addition, it is advantageous that the underlay 10 is not attached to either the rug 12 or the flooring surface F and can be easily installed or removed. Furthermore, the reversible feature is quite advantageous and enables the same underlay 10 to be used regardless of the flooring surface F over which the rug 12 is laid. As will be appreciated, this is advantageous in that a store need only stock one product for various uses. As will be appreciated, this reduces inventory and associated costs.

Figure 5:
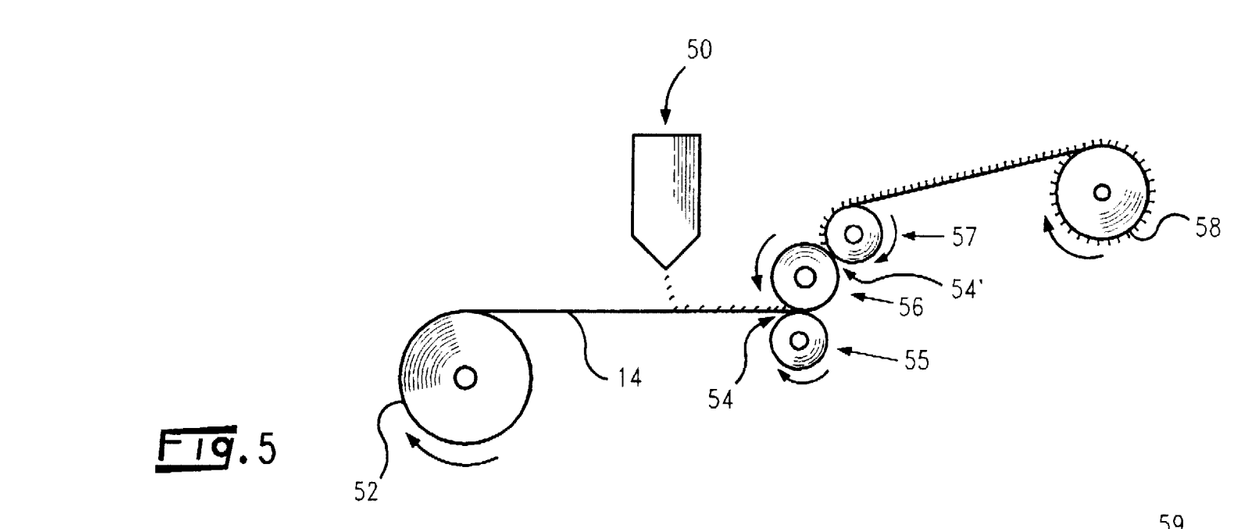
FIG. 5 is a block diagram showing steps in the production of the underlay of FIGS. 1-4 and FIG. 5a is a close-up of a roller.

FIG. 5 is a block diagram showing steps in a preferred method for producing the underlay 10. As shown, the layer 16 is preferably formed by heating a thermoplastic material as at 50, such as EVA, continuously onto the layer 14 provided from a roll 52 of layer material and thereafter forcing the composite structure through a nip 54 between cooled rollers 55 and 56 and nip 54' between rollers 56 and 57. The resulting composite underlay may be collected on roller 58. The layer 14 is preferably provided at ambient temperature and the thermoplastic material preferably has a temperature of from about 280° F. to about 360° F. when deposited onto the layer 14. The rollers 55–57 each preferably have a temperature of from about 32° F. to about 65° F. and a diameter of from about 6 inches to about 24 inches, with a nip pressure sufficient to form the nibs, i.e., about 200 psi.

Figure 5A:
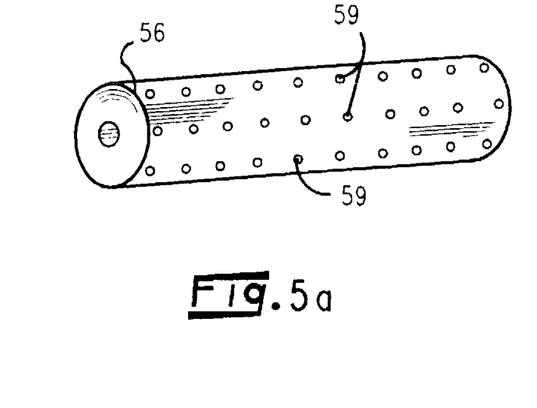

To provide the nibs 26 (or 26' or 26"), the roller 56 preferably has a plurality of small openings 59 spaced evenly around the roll and configured to conform to the desired nib size and shape (FIG. 5a). Alternatively, the layer 16 may be provided separately and thereafter attached to the layer 14, as by a suitable adhesive, such as a pressure sensitive or hot melt adhesive.

Figure 6:
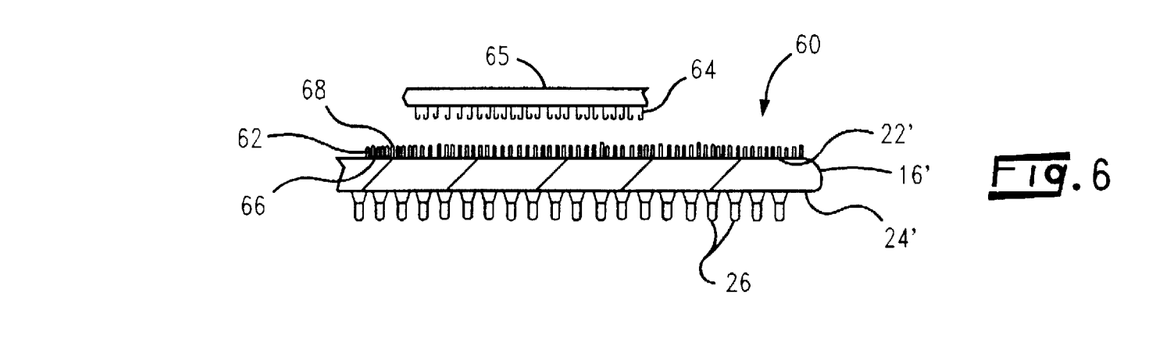
FIG. 6 is a cross-sectional exploded view of another embodiment of an underlay according to the invention.
Figure 7:
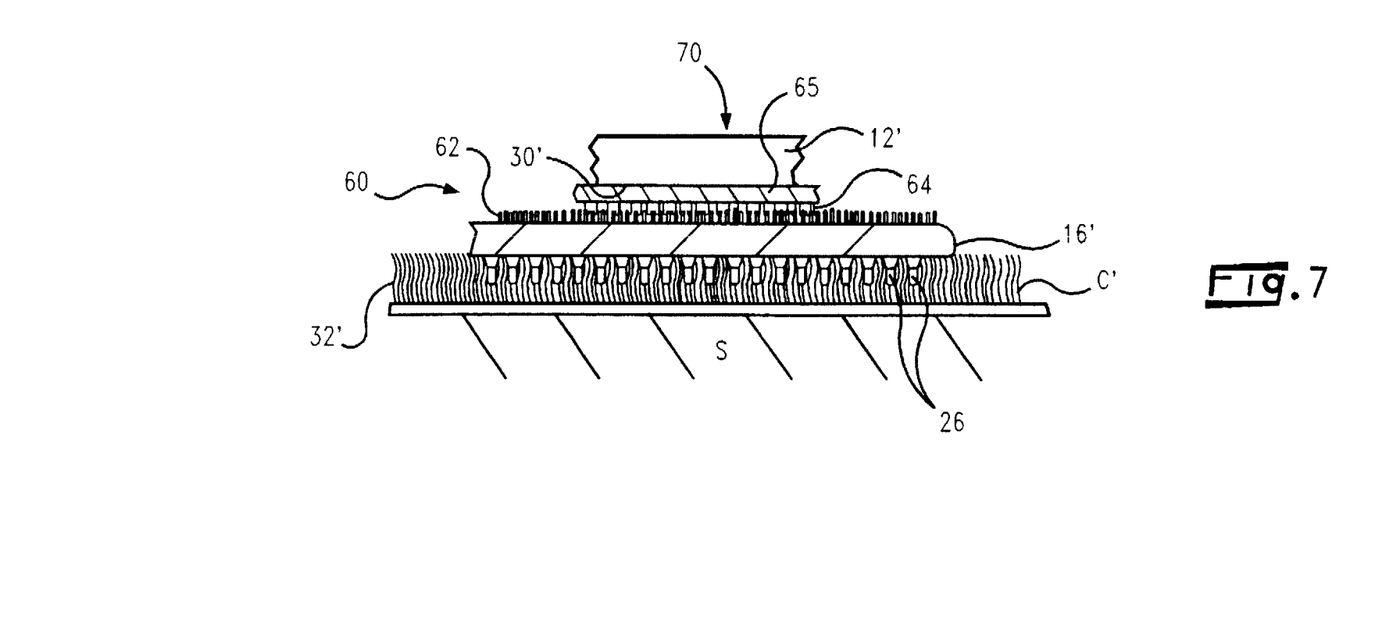
FIG. 7 is a cross-sectional view of the underlay of FIG. 6 positioned between a rug and an underlying carpeted surface to inhibit movement of the rug relative to the carpeted surface.

With reference now to FIGS. 6 and 7, there is shown an underlay 60 in accordance with another embodiment of the present invention having a layer of loop or needle punched material 62 attached to a relatively firm layer 16' and a layer of hook material 64 that is attachable to the underside of a rug 12' and is releasably attachable with the loop material 62. In this regard, the hook material 64 preferably includes an adhesive backing material 65 having suitable removable pull strips for exposing an adhesive surface for attachment of the layer of hook material to a surface, such as the underside of a rug or a flooring surface.

The layer 16' is preferably identical to the layer 16 described previously in connection with FIGS. 1–4 and includes a relatively smooth surface 22' opposite a relatively rugous outwardly facing surface 24' having nibs such as the nibs 26, 26' or 26" described previously. The material 62 is preferably matingly attached to the surface 24' of the layer 16', as by thermal bonding or adhesive so that one surface 66 of the layer 62 is against the layer 16' and the other surface, identified as surface 68, is exposed for releasably attaching to the hook material 64 attached, as by the adhesive backing 65, to the underside 30' of the rug 12'. As used herein, the terminology "releasably attachable" and "releasably attached" will be understood to refer to well known properties of hook and loop material whereby the hook and loop material securely attach to one another, yet release as desired by pulling them apart.

Virtually any hook and loop material may be used, however, a preferred loop material 62 is a knitted loop scrim available as Style 36643 (synthetic knit) from Guilford Mills of Greensboro, N.C., and a preferred hook material 64 is a hook material available under the tradename VELCRO from 3-M Company of Minnesota. As will be appreciated, the hook and loop material is reversible, in that the hook material may be positioned at the location described for the loop material and vice-versa. Furthermore, other attachment devices, such as buttons and button-holes, snaps, hooks, and double-sided tape may be used, however, the use of hook and loop material is preferred due to its ease of use, reusability, low profile, and low visibility.

With reference now to FIG. 7, there is shown a preferred embodiment of a flooring structure 70 in which the underlay 60 is positioned between rug 12' and carpeting C', with the underlay 60 releasably attached to the rug 12' (and hence the rug 12 and the underlay 60 are restrained from relative movement) by the hook 64 and loop material 62 and the underlay 60 restrained against movement relative to the underlying carpet C' by the nibs 26 in a manner to that described previously in connection with FIG. 3a. Thus, it will be appreciated that the loop material 62 and the hook material 64 cooperate to inhibit movement of the rug 12' relative to the underlay 60 and the nibs 26 of the underlay engage fibers 32 and filaments 32' of the carpet C' to provide a frictional interface between the underlay 60 and the carpet C' so that there is increased resistance to sliding of the rug 12' relative to the carpet C'.

Figure 8:
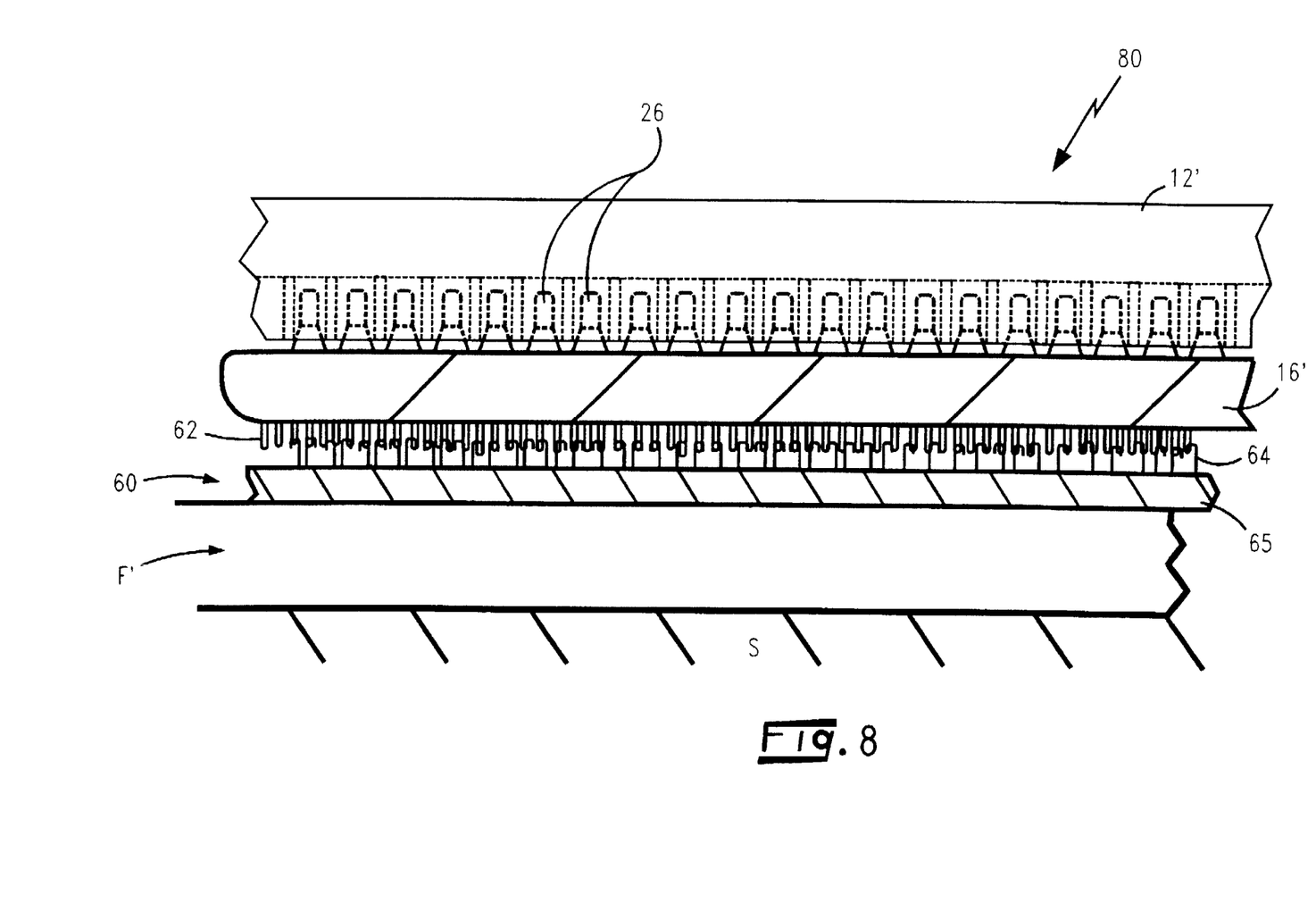
FIG. 8 is a cross-sectional view of the underlay of FIG. 6 positioned between a rug and a relatively hard flooring surface to inhibit movement of the rug relative to the flooring surface.

The underlay of FIG. 6 is reversible in that it may be used either with carpeting, as shown in FIG. 7, or flipped over and used over hard flooring. For example, and with reference now to FIG. 8, there is shown a preferred embodiment of a flooring structure 80 in which the underlay 60 is positioned between rug 12' and flooring F', with the underlay 60 releasably attached to the flooring F' by the hook material 64 and loop material 62 and the underlay 60 restrained against movement relative to the rug 12' by the nibs 26. As shown, the loop material 64 may be secured to the flooring F' as by its adhesive backing 65.

The foregoing description of certain embodiments of the present invention has been provided for purposes of illustration only, and it is understood that numerous modifications or alterations may be made without departing from the spirit and scope of the invention as defined in the following claims.

What is claimed is:

1. A flooring structure, comprising:

a rug having an upper decorative surface and a lower backing surface, and an underlay for positioning between the backing surface of the rug and an underlying upwardly facing carpeted surface to inhibit movement of the rug relative to the underlying carpeted surface, the underlay comprising:

a layer of loop material having oppositely facing surfaces;

a substantially firm layer adjacent the layer of loop material and having a first substantially smooth surface opposite a second substantially rugous outwardly facing surface;

one surface of the layer of loop material being matingly attached to the first surface of the substantially firm layer and the underlay being positionable such that the substantially rugous surface is positionable adjacent the carpeted surface and the other surface of the layer of loop material is positionable adjacent the backing surface of the rug; and attachment means for attaching the backing surface of the rug to the adjacent layer of loop material, said attachment means comprising one or more portions of hook material positionable between the backing surface of the rug and the adjacent loop material and having an adhesive surface fixedly securable to the backing surface of the rug and the hook material releasably attachable to the adjacent surface of the loop material.

2. A flooring structure, comprising:

a rug, and a reversible underlay for positioning between the rug and an underlying flooring surface to inhibit movement of the rug relative to the underlying flooring surface, the underlay comprising:

a substantially resilient, conformable layer having a first substantially flat surface opposite a second substantially flat outwardly facing surface, the second surface being positionable adjacent the underside of the rug or the flooring surface for conforming thereto; and a substantially firm layer adjacent the substantially resilient, conformable layer, the substantially firm layer comprising a one-piece thermoplastic material selected from the group consisting of ethylene vinyl acetate, polyurethane, polypropylene, polyamide, polyester, polyvinyl chloride, and mixtures thereof, the substantially firm layer having a substantially smooth surface opposite a substantially rugous outwardly facing surface, the substantially rugous surface being positionable adjacent the underside of the rug or the flooring surface for frictional engagement therewith, said first surface of the substantially resilient, conformable layer being matingly attached to the substantially smooth surface of the substantially firm layer.

3. The flooring structure of claim 2, wherein the underlying flooring surface comprises a carpeted surface and the second surface of the resilient, conformable layer is positionable adjacent the underside of the rug and the substantially rugous surface is positionable adjacent the carpeted surface for frictional engagement therewith.

4. The flooring structure of claim 2, wherein the underlying flooring surface comprises a substantially hard flooring surface and the second surface of the resilient, conformable layer is positionable adjacent flooring surface and the substantially rugous surface is positionable adjacent the underside of the rug for frictional engagement therewith.

5. The flooring structure of claim 2, wherein the substantially resilient, conformable layer comprises a material selected from the group consisting of polyurethane, styrene-butadiene latex, natural latex, neoprene latex, acrylonitrile butadiene rubber, acrylic latex, polyvinyl chloride plastisol, and sponge rubber.

6. The flooring structure of claim 5, wherein the material is styrene butadiene latex having a polypropylene scrim backing.

7. The flooring structure of claim 2, wherein the substantially rugous second surface of the substantially firm layer comprises a plurality of protrusions.

8. The flooring structure of claim 2, wherein the rug comprises a textile-backed rug.

9. A flooring structure, comprising:
a rug having an upper decorative surface and a lower backing surface, and an underlay for positioning between the backing surface of the rug and an underlying carpeted surface to inhibit movement of the rug relative to the underlying carpeted surface, the underlay comprising:
a substantially resilient, conformable layer having a first substantially flat surface opposite a second substantially flat outwardly facing surface, the substantially resilient, conformable layer comprising a material selected from the group consisting of polyurethane, styrene-butadiene latex, natural latex, neoprene latex, acrylonitrile butadiene rubber, acrylic latex, polyvinyl chloride plastisol, and sponge rubber; and
a substantially firm layer adjacent the substantially resilient, conformable layer and having a first substantially smooth surface opposite a second substantially rugous outwardly facing surface,
said first surface of the substantially resilient, conformable layer being matingly attached to the first surface of the substantially firm layer and the underlay being positioned relative to the rug such that the backing surface of the rug is adjacent to and fictionally engages the first surface of the substantially resilient, conformable layer and the rugous surface of the substantially firm layer is adjacent to and fictionally engages the carpeted surface.

10. The flooring structure of claim 9, wherein the substantially resilient, conformable layer comprises a material selected from the group consisting of polyurethane, styrene-butadiene latex, natural latex, neoprene latex, acrylonitrile butadiene rubber, acrylic latex, polyvinyl chloride plastisol, and sponge rubber.

11. The flooring structure of claim 9, wherein the substantially rugous second surface of the substantially firm layer comprises a plurality of protrusions extending generally outwardly from the second surface opposite of the first surface of the substantially firm layer.

12. The flooring structure of claim 9, wherein the substantially firm layer comprises a one-piece thermoplastic material selected from the group consisting of polyethylene vinyl acetate, polypropylene, polyamide, polyester, polyvinyl chloride, and mixtures thereof.

13. A flooring structure, comprising:
a rug having an upper decorative surface and a lower backing surface, and an underlay for positioning between the backing surface of the rug and an underlying carpeted surface to inhibit movement of the rug relative to the underlying carpeted surface, the underlay comprising:
a substantially resilient, conformable layer having a first substantially flat surface opposite a second substantially flat outwardly facing surface; and
a substantially firm layer adjacent the substantially resilient, conformable layer and having a first substantially smooth surface opposite a second substantially rugous outwardly facing surface, the substantially firm layer comprising a one-piece thermoplastic material selected from the group consisting of polyethylene vinyl acetate, polypropylene, polyamide, polyester, polyvinyl chloride, and mixtures thereof.
said first surface of the substantially resilient, conformable layer being matingly attached to the first surface of the substantially firm layer and the underlay being positioned relative to the rug such that the backing surface of the rug is adjacent to and fictionally engages the first surface of the substantially resilient, conformable layer and the rugous surface of the substantially firm layer is adjacent to and fictionally engages the carpeted surface.

14. The flooring structure of claim 13, wherein the substantially resilient, conformable layer comprises a material selected from the group consisting of polyurethane, styrene-butadiene latex, natural latex, neoprene latex, acrylonitrile butadiene rubber, acrylic latex, polyvinyl chloride plastisol, and sponge rubber.

15. The flooring structure of claim 13, wherein the substantially rugous second surface of the substantially firm layer comprises a plurality of protrusions extending generally outwardly from the second surface opposite of the first surface of the substantially firm layer.

16. The flooring structure of claim 13, wherein the substantially resilient, conformable layer comprises a material selected from the group consisting of polyurethane, styrene-butadiene latex, natural latex, neoprene latex, acrylonitrile butadiene rubber, acrylic latex, polyvinyl chloride plastisol and sponge rubber.

17. A reversible underlay system for positioning between a backing surface of a rug and an underlying flooring surface to inhibit movement of the rug relative to the flooring surface, said underlay system comprising.
a thermoplastic sheet material selected from the group consisting of polyethylene vinyl acetate, polypropylene, polyamide, polyester, polyvinyl chloride, and mixtures thereof, the thermoplastic sheet material a having a substantially smooth surface opposite a substantially rugous surface;
a hook material and a loop material, the loop material having a first surface matingly attachable to the substantially smooth surface of the thermoplastic sheet material, and a second surface opposite the first surface of the loop material, the second surface of the loop material being releasably attachable to a first surface of the hook material, the hook material further including a second surface opposite the first surface thereof, the second surface of the hook material comprising an adhesive surface fixedly securable to either the backing surface of rug or the flooring surface.

18. The underlay system of claim 17, wherein the substantially rugous surface of the thermoplastic material comprises a plurality of protrusions.

19. The underlay system of claim 17, wherein the underlying flooring system over which the system may be positioned comprises a carpeted surface.

20. The underlay system of claim 17, wherein the underlying flooring surface over which the system may be positioned comprises a substantially hard flooring surface.

* * * * *

UNITED STATES PATENT AND TRADEMARK OFFICE
CERTIFICATE OF CORRECTION

PATENT NO. : 5,753,336    Page 1 of 2

DATED : May 19, 1998

INVENTOR(S) : Thomas Emerson Stull

It is certified that error appears in the above-identified patent and that said Letters Patent is hereby corrected as shown below:

Column 2, line 18, after "aspect," insert -- the invention provides --.

Column 2, line 63, after "underlay" insert -- . --.

Column 3, line 5, after "1-4" insert -- , --.

Column 3, line 25, change "wither" to -- either --.

Column 3, line 47, after change "such a" to -- such as --.

Column 4, line 27, after "virtually" delete "of".

UNITED STATES PATENT AND TRADEMARK OFFICE
CERTIFICATE OF CORRECTION

PATENT NO. : 5,753,336

DATED : May 19, 1998

INVENTOR(S) : Thomas Emerson Stull

It is certified that error appears in the above-identified patent and that said Letters Patent is hereby corrected as shown below:

Column 5, line 2, after "1/16" insert -- inch --.

Column 5, line 2, after "3/8" insert -- inch --.

Column 5, line 5, after "1/4" insert -- inch --.

Column 7, line 43, change "12" to -- 12' --.

Column 10, line 16, change "fictionally" to -- fricitionally --.

Column 10, line 19, change "fictionally" to -- frictionally --.

Column 10, line 44, after "material" delete -- a --.

Signed and Sealed this

Twenty-second Day of September, 1998

Attest:

BRUCE LEHMAN

*Attesting Officer*    *Commissioner of Patents and Trademarks*